UNITED STATES PATENT OFFICE.

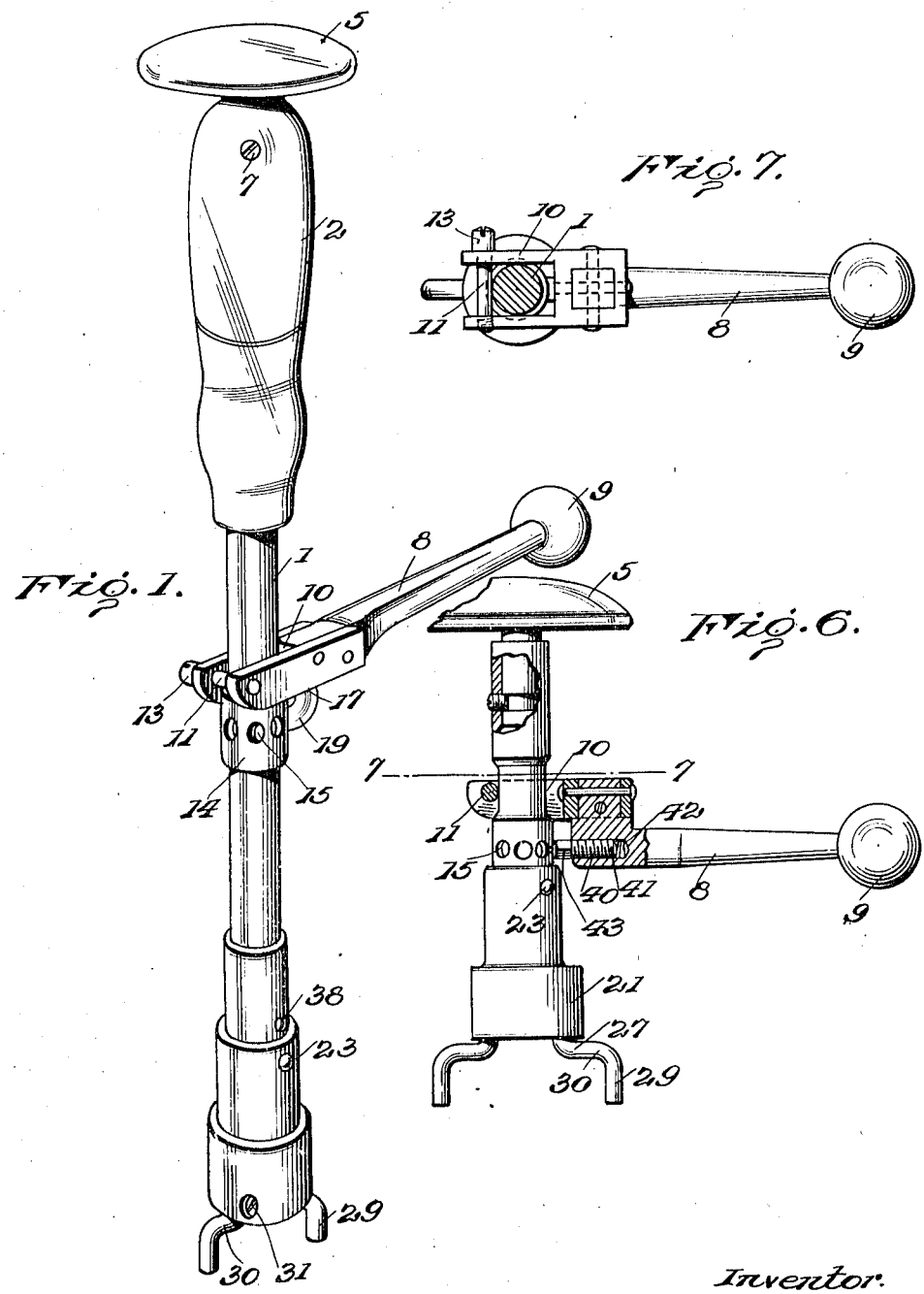

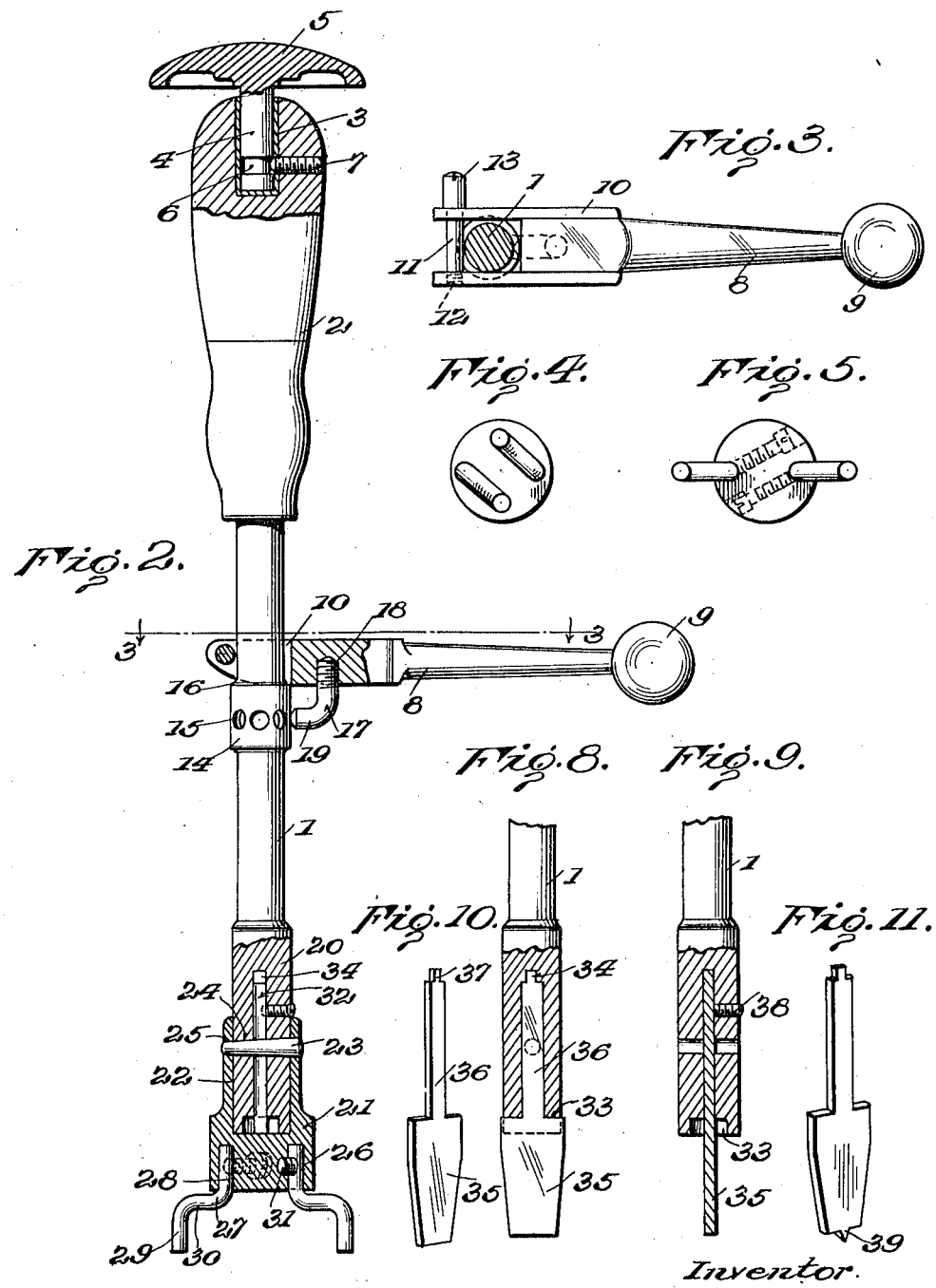

WILLIAM E. MOWERS, OF YORK, PENNSYLVANIA.

VALVE-GRINDING TOOL.

1,314,012.   Specification of Letters Patent.   Patented Aug. 26, 1919.

Application filed March 11, 1919. Serial No. 281,926.

*To all whom it may concern:*

Be it known that I, WILLIAM E. MOWERS, citizen of the United States, residing at York, in the county of York and State of Pennsylvania, have invented certain new and useful Improvements in Valve-Grinding Tools, of which the following is a specification.

This invention relates to valve grinding tools and has as its primary object to provide a tool of this class which will be adapted for universal use, being capable of application to practically any type of valve head whether the valve is a part of an automobile engine, motorcycle engine, stationary engine, or the like. Incidentally, the invention contemplates so constructing the tool that the same may be employed in a manner to permit of a desired degree of pressure being exerted in the direction of the valve being ground or may be employed by being rotated between the palms of the hands as is done when a screw driver is employed for this purpose. Also, the tool embodying the present invention is adapted to be employed as a simple screw driver.

A further object of the invention is to provide a tool adapted to be employed in such a manner that the valve may be ground evenly and consequently more accurately than by the use of most tools designed for this purpose or an improvised device such as a screw driver.

Another object of the invention is to so construct the tool that the same may be adjusted at its valve engaging portion so as to adapt the tool for application to valves of various sizes and particularly to valves having tool receiving sockets spaced apart various distances.

The invention has as a further object to so construct the tool that the same may be adjusted and its parts interchanged to adapt it for various applications and so that these adjustments may be effected conveniently and expeditiously.

In the accompanying drawings:

Figure 1 is a perspective view of one form of the tool embodying the present invention.

Fig. 2 is a view partly in elevation and partly in vertical section through the tool shown in Fig. 1.

Fig. 3 is a horizontal sectional view on the line 3—3 of Fig. 2.

Fig. 4 is a bottom plan view of the head of the tool, the valve engaging elements being shown in one position of adjustment.

Fig. 5 is a similar view illustrating the said elements in another position of adjustment.

Fig. 6 is a view similar to Fig. 2, illustrating a modified arrangement of the tool.

Fig. 7 is a horizontal sectional view on the line 7—7 of Fig. 6.

Fig. 8 is a view partly in elevation and partly in section, illustrating the manner of equipping the tool with a screw driver bit.

Fig. 9 is a vertical sectional view taken in a plane at right angles to the plane of Fig. 8.

Fig. 10 is a perspective view of the bit shown in Fig. 8.

Fig. 11 is a perspective view of a modified form of bit.

The forms of the invention shown in Figs. 1 and 6 are in many respects identical, the form shown in Fig. 1 being preferred and the form shown in Fig. 6 being designed particularly for use where a short shank is required as, for example, in certain makes of automobiles in which one or more of the valves is located in a nearly inaccessible position beneath the dash or footboard, and in the figures illustrating these two forms of the invention, parts which correspond with each other will be indicated by like reference numerals.

The tool embodies a shank which is indicated in general by the numeral 1, and this shank has fixed to its upper end a handle or hand grip 2 by means of which the tool may be turned when employed as a screw driver and also when employed, under certain conditions to be hereinafter explained, as a valve grinder. Fitted into the upper end of the handle 2 is a socket 3 into which is rotatably fitted the stem 4 of a hand knob 5, the stem being formed with a circumferential groove 6 and a screw 7 being adjustably threaded through one side of the handle with its inner end entering the socket 3 and projecting into the said groove 6 so as to hold the hand knob detachably connected with the handle and yet permit of its free swiveling or turning movement.

The numeral 8 indicates in general a hand lever provided at its outer end with a knob 9 which may be grasped for the purpose of swinging the said lever and this lever at its inner end has an elongated opening, as indicated by the numeral 10 so as to straddle the shank 1. Said opening is preferably formed by bifurcating or forking the end of the lever, passing the form arms astride the shank, and connecting them behind it. As shown herein a fulcrum pin 11 is fitted through one arm and threaded at its other end, as at 12, into the other arm, the pin being provided with a head having a groove 13 for the application of a screw driver whereby the pin may be removed and threaded into place in attaching and detaching the lever to and from the shank 1. It will be observed by reference to Fig. 2, that this pin 11 is located above the longitudinal median line of the lever 8 or, in other words, above the axis of the said lever. At a point in its length the shank 1 is preferably enlarged, as indicated by the numeral 14, and its enlarged portion is formed with a circumferential series of sockets 15, the upper end of the enlargement constituting an annular shoulder 16 to limit the downward movement of the lever 8 upon the said shank. The numeral 17 indicates a pin which is threaded at its inner end or otherwise secured in the under side of the lever 8, as indicated by the numeral 18, the lower portion of this pin being bent laterally inwardly to provide a tip 19 engageable interchangeably in the sockets 15. At this point it will be evident that the lever 8 will, when applied to the shank 1, assume by gravity a position with the engaging tip of the pin 17 resting in one of the sockets 15 and thus, when the tool is engaged with a valve head in a manner to be presently explained and one hand is brought to bear against the knob 5, the lever 8 may be oscillated so as to cause the tool to impart corresponding motion to the valve head. After this motion has been continued for some time the lever may be swung slightly upwardly in a plane through the shank so that the engaging tip of the pin 17 will clear the socket in which it was seated and the lever may then be rotated upon the shank and again borne down so as to engage the said tip in the next socket of the series and then manipulated to oscillate the tool. When this operation has been repeated until the pin has been engaged in all of the sockets, the position of the valve will have been shifted during the grinding operation so as to result in an even and, therefore, accurate grinding of the valve to its seat.

The lower end of the shank 1, which is preferably enlarged as indicated by the numeral 20, has fitted to it the head of the tool, which head is indicated in general by the numeral 21, said head having a socket 22 in its upper end to adapt it to be fitted to the said enlarged lower end of the shank, and the said head being held in position upon the shank by means of a taper pin 23 driven into openings 24 and 25 formed transversely in the end of the shank and the wall of the socket 22. The head 21 is formed at diametrically opposite points in its under face with vertically extending sockets 26. The numeral 27 indicates in general the valve head engaging elements which are carried by the head and each of these elements comprises a shank portion 28 which is fitted into the respective one of the sockets 26, and a valve engaging finger portion 29 which is laterally offset with relation to the shank portion 28 and located below the same, this relative arrangement of the parts being effected by providing a lateral bend 30 in the element 27 between the shank portion and the said finger 29. It will be evident from the foregoing, that the shanks 28 of the valve engaging elements are rotatably adjustably fitted into the respective sockets 26 so that by rotating the said elements their finger portions 29 may be brought to position spaced various distances apart, due to the crank portions 30 offsetting these finger portions with relation to the axis about which the elements are adjusted. Thus, as shown in Fig. 4, the fingers may be brought relatively close together to adapt them for engagement in the sockets of a valve when the sockets are located relatively close together, or the fingers may be positioned a considerable distance apart, as shown in Fig. 5, to adapt them to enter the sockets of a valve where the sockets are spaced apart a considerable distance. In order to hold said elements in their various positions of adjustment, set screws 31 are adjustably threaded through the outer side of the head 21 and at their inner ends are adapted to enter the sockets 26 and bind against the shanks of the respective elements 27, as clearly shown in Figs. 2 and 5 of the drawings.

In order to adapt the shank of the tool for the reception of a screw driver bit, the portion 20 of the shank is formed with a vertically extending socket 32 opening through its lower end and communicating at its lower end with a transverse slot or notch 33 formed diametrically in the said lower portion of the shank. The socket 32 is slightly reduced at its upper end, as at 34, for a purpose to be explained. One form of screw driver bit is shown in Fig. 10 of the drawings and the same comprises the bit proper, indicated by the numeral 35 and a shank 36, which has flat sides and is adapted to be fitted in the said socket 32, the shank at its upper end being reduced in width, as indicated by the numeral 37, to fit within the reduced portion 34 of the said socket. The upper portion of the blade of the bit is designed to seat in the transverse slot or notch 33 in the manner clearly shown in Fig. 8, so that this portion of the bit, which is the strongest portion, will receive the full strain when the tool is in use. A set screw 38 is adjustably threaded through one side of the portion 20 of the tool shank and may be tightened to bear against the shank 36 of the bit 35. A modified form of bit is shown in Fig. 11 of the drawings and corresponds to the bit shown in Fig. 10 except that its engaging end is provided with a spur 39. It will be noted, of course, that before applying the bit to the tool shank, it is necessary to tap upon the taper pin 23 so as to release the same, whereupon the head 21 of the tool may be slipped off from the shank 1.

As heretofore stated, the form of tool shown in Fig. 6 is substantially identical with that previously described except that the shank is made much shorter and the handle 2 is omitted so that this form of tool may be conveniently employed where the space is restricted. Also, in this form of tool, the pin 17 is replaced by a modified form of pin indicated by the numeral 40, this pin being straight and threaded as indicated by the numeral 41 and fitted adjustably into a threaded socket 42 formed in an elbow of the lever 8. The engaging tip of this pin projects, of course, beyond the elbow of the said lever so as to be engageable interchangeably in the sockets 15 and said pin is squared as indicated by the numeral 43 so that a wrench may be applied thereto for the purpose of adjusting the pin to cause same to project a greater or less distance as desired.

From the foregoing description of the invention and considering that the tool is arranged as shown in either Figs. 2 or 6 of the drawings, the same may be employed by engaging the valve engaging elements with the valve to be ground, bearing at one end upon the hand knob 5, and oscillating the lever 8 in the manner heretofore stated; or, if the valve is not adapted to receive the engaging fingers 29, one or the other of the screw driver bits shown in Figs. 10 and 11 may be employed and substituted for the head 21 in the manner heretofore described. Also, if described, the lever 8 may be disconnected from the shank of the tool and the knob 5 removed, whereupon the handle 2 may be rotated between the palms of the hands in manipulating said tool. Furthermore, if desired, the knob 5 may be removed, as also the lever 8 and head 21, and then by the application of either screw driver bit, the tool may be employed as a simple screw driver. In this latter event, the lever 8 may be left in place if it is found that the screw to be loosened is so tightly threaded into place that it could not be conveniently removed except by the application of the additional leverage which may be gained through the use of the said lever 8.

Having thus described the invention, what is claimed as new is:

1. In a tool of the class described, a rotatable member, valve engaging elements rotatably adjustably mounted upon the said member at opposite sides of the axis of rotation thereof and having engaging portions offset with relation to their portions which are connected with the said member, and means for holding said elements in positions of adjustment.

2. In a tool of the class described, a rotatable member, valve engaging elements having shank portions rotatably adjustably engaged with the said member at opposite sides of the axis of rotation thereof, the said elements including engaging finger portions offset with relation to the said shank portions, and means for holding the said elements in positions of adjustment.

3. In a tool of the class described, a rotatable member having sockets located at the opposite sides of the axis of rotation thereof, valve engaging elements having shanks fitting rotatably adjustably in the sockets, the said elements having cranked intermediate portions and engaging fingers, and set screws carried by said member and binding the shanks of the said engaging elements whereby to hold the elements in positions of adjustment.

4. In a tool of the class described, a shank, a valve engaging element carried thereby, an operating lever forked at its inner end and passing astride the shank, a fulcrum screw passing removably through the fork-arms behind the shank, and means on the lever for locking it in various positions to the shank when the lever is depressed around its fulcrum.

5. In a tool of the class described, a shank, valve engaging means carried thereby, an operating lever fulcrumed at its inner end on and extending thence laterally from the shank and rotatably adjustable about the same, said lever having an elbow in its body, and means in said elbow for connecting the lever with the shank in various positions of its adjustment.

6. In a tool of the class described, a shank having an enlargement formed with a series of sockets, valve engaging means carried by the lower end of the shank, an operating lever forked at its inner end and passing astride the shank above said enlargement, a fulcrum pin connecting the fork-arms behind the shank and above the axis of the lever, and a locking pin carried by the lever forward of the shank with its tip standing below the axis of the lever and adapted for selective engagement with said sockets.

7. In a tool of the class described, a shank, valve engaging means carried thereby, the shank having a circumscribing series of sockets, an operating lever extending laterally from the shank and having an opening at its inner end mounted loosely on the shank whereby the lever may be swung in a plane through the shank or may be rotatably adjusted about it, and an element on the lever engageable interchangeably in said sockets.

8. In a tool of the class described, a shank, valve engaging means carried by the shank, an operating lever fulcrumed upon the shank to swing in a plane through such shank and extending laterally therefrom and rotatably adjustable about the shank, the shank having a circumscribing series of sockets, and a pin carried by the operating lever and engageable interchangeably in the said sockets.

9. In a tool of the class described, a shank, means carried by the shank for engagement with a valve, an operating lever having a fork straddling the shank, a fulcrum pin fitted through the fork arms for engagement with one side of the shank, and a locking element carried by the said lever and engageable with the opposite side of the shank.

10. In a tool of the class described, a shank, means carried by the shank for engagement with a valve, an operating lever having a fork straddling the shank, a fulcrum connecting the fork arms for engagement with one side of the shank, and a locking element carried by the said lever and engageable with the opposite side of the shank, the said fulcrum being located above the axis of the lever.

11. In a tool of the class described, a shank, means carried by the shank for engagement with a valve, an operating lever having a fork end straddling the shank, a pin across the fork for engagement with one side of the shank, and a locking element carried by the said lever and engageable with the opposite side of the shank, said locking element being adjustable upon the lever toward and from the said shank.

12. In a tool of the class described, a shank provided at its upper end with a handle, a hand knob swiveled to the handle and detachable therefrom, an operating lever extending laterally from the shank and detachably connected therewith, the shank at its lower end having a socket to hold a bit, a head removably fitted to the said lower end of the shank, and valve engaging elements carried by the said head.

In testimony whereof I affix my signature.

WILLIAM E. MOWERS. [L. S.]